US012694762B1

(12) United States Patent
Mergliano

(10) Patent No.: US 12,694,762 B1
(45) Date of Patent: Jul. 28, 2026

(54) UNAUTHORIZED DEVICE DETECTION AT AUTOMATED TELLER MACHINES

(71) Applicant: Bank of America Corporation, Charlotte, NC (US)

(72) Inventor: Christian A. Mergliano, Lancaster, CA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 19/069,310

(22) Filed: Mar. 4, 2025

(51) Int. Cl.
*G07F 19/00* (2006.01)

(52) U.S. Cl.
CPC ................................ *G07F 19/2055* (2013.01)

(58) Field of Classification Search
CPC ... G07F 19/2055; G07F 7/0873; G06K 13/06; G06K 13/08; G06K 7/10257; G06K 7/10287; G06Q 20/1085
USPC .......................................................... 235/379
See application file for complete search history.

(56) References Cited

U.S. PATENT DOCUMENTS 8,251,282 B2 8/2012 Clark et al.
8,767,422 B2 7/2014 Jiang-Hafner et al.
10,121,331 B1 11/2018 Hodges et al.
10,262,326 B1 4/2019 Yaqub
11,049,370 B2 6/2021 Hodges
11,055,500 B2 7/2021 Takahashi et al.
2009/0159687 A1* 6/2009 Clark .................... G07F 7/0873 235/475
2016/0162712 A1* 6/2016 Ozawa ................... G06K 7/084 235/440
2019/0340892 A1* 11/2019 Rodriguez Bravo ........................ G06K 19/07769
2024/0038029 A1* 2/2024 Whytock ............ G07F 19/2055

FOREIGN PATENT DOCUMENTS

EP 1513093 A2 * 3/2005 ......... G06K 13/0875

* cited by examiner

*Primary Examiner* — Suezu Ellis
(74) *Attorney, Agent, or Firm* — Banner & Witcoff, Ltd.

(57) ABSTRACT

Arrangements for detecting unauthorized devices at automated teller machines (ATMs) are provided. In some examples, an ATM including a display and a card acceptor including at least one Hall effect sensor within the card acceptor, may receive, from the at least one Hall effect sensor, an indication of a presence of a physical magnet within the card acceptor. In response, the ATM may generate a mitigation action and a notification indicating a presence of an unauthorized device within the card acceptor. The ATM may execute the mitigation action which may cause a modification of functionality of the ATM. For instance, the ATM and/or card reader may be disabled, the ATM may display a notification that other forms of authentication should be used, or the like. The ATM may transmit or send the notification to an enterprise computing system which may cause the enterprise computing system to display the notification.

17 Claims, 10 Drawing Sheets

UNAUTHORIZED DEVICE DETECTION AT AUTOMATED TELLER MACHINES

BACKGROUND

Aspects of the disclosure relate to electrical computers, systems, and devices for detecting unauthorized devices at automated teller machines (ATMs).

Automated teller machines (ATMs) provide a convenient device to perform various transactions. However, unauthorized users or threat actors have been known to use unauthorized devices, such as skimming devices, shimming devices, and the like, to obtain, without permission, user data, payment device data, and the like, to sell the data or use it to make unauthorized purchases. The unauthorized devices are often inserted into a card acceptor device or slot on the ATM in order to capture the user or card data when the user inserts a card into the card acceptor. Accordingly, early detection of any unauthorized device at an ATM may reduce or eliminate impact of the unauthorized device on customers or users of the ATM. Accordingly, it would be advantageous to detect unauthorized devices in ATMs and remove the devices.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with efficiently identifying unauthorized devices in an ATM or ATM card acceptor.

In some examples, an ATM including a display, a card acceptor including a card reader and at least one Hall effect sensor within the card acceptor, a processor, a communication interface and a memory may receive, from the at least one Hall effect sensor, an indication of a presence of a physical magnet within the card acceptor. In response, the ATM may generate a mitigation action and a notification indicating a presence of an unauthorized device within the card acceptor. The ATM may execute the mitigation action which may cause a modification of functionality of the ATM. For instance, the ATM and/or card reader may be disabled, the ATM may display a notification that other forms of authentication should be used, or the like. The ATM may transmit or send the notification to an enterprise computing system which may cause the enterprise computing system to display the notification.

In some examples, the at least one Hall effect sensor may be configured to detect the presence of a physical magnet when the unauthorized device is in an in-use state (e.g., powered on) and when the unauthorized device is in a disabled state (e.g., powered off, no power supply present, or the like).

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, unauthorized actors often insert unauthorized devices, such as skimmer devices, into a card acceptor of an ATM to obtain user data, card data, or the like, without user authorization. Accordingly, efficient detection of any unauthorized device within the card acceptor or ATM would mitigate impact of the unauthorized device. As discussed herein, the arrangements described include using Hall effect sensors in the card reader to detect a presence of a physical magnet within the card acceptor (e.g., slot into which the user inserts their card to initiate a transaction) and generate and execute one or more mitigation actions.

These and various other arrangements will be discussed more fully below.

Figure 1A:
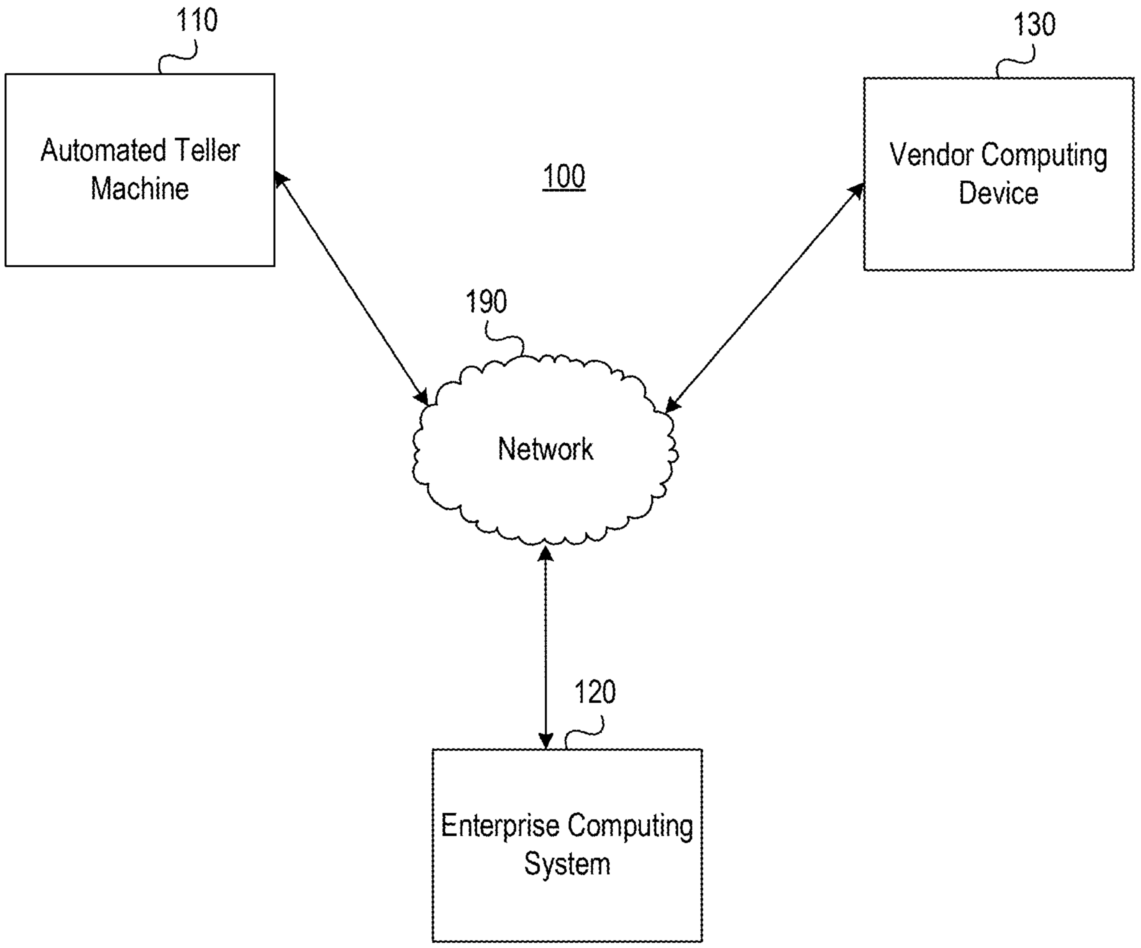
FIGS. 1A-1B depict an illustrative computing environment for detecting unauthorized devices at an ATM in accordance with one or more aspects described herein.
Figure 1B:
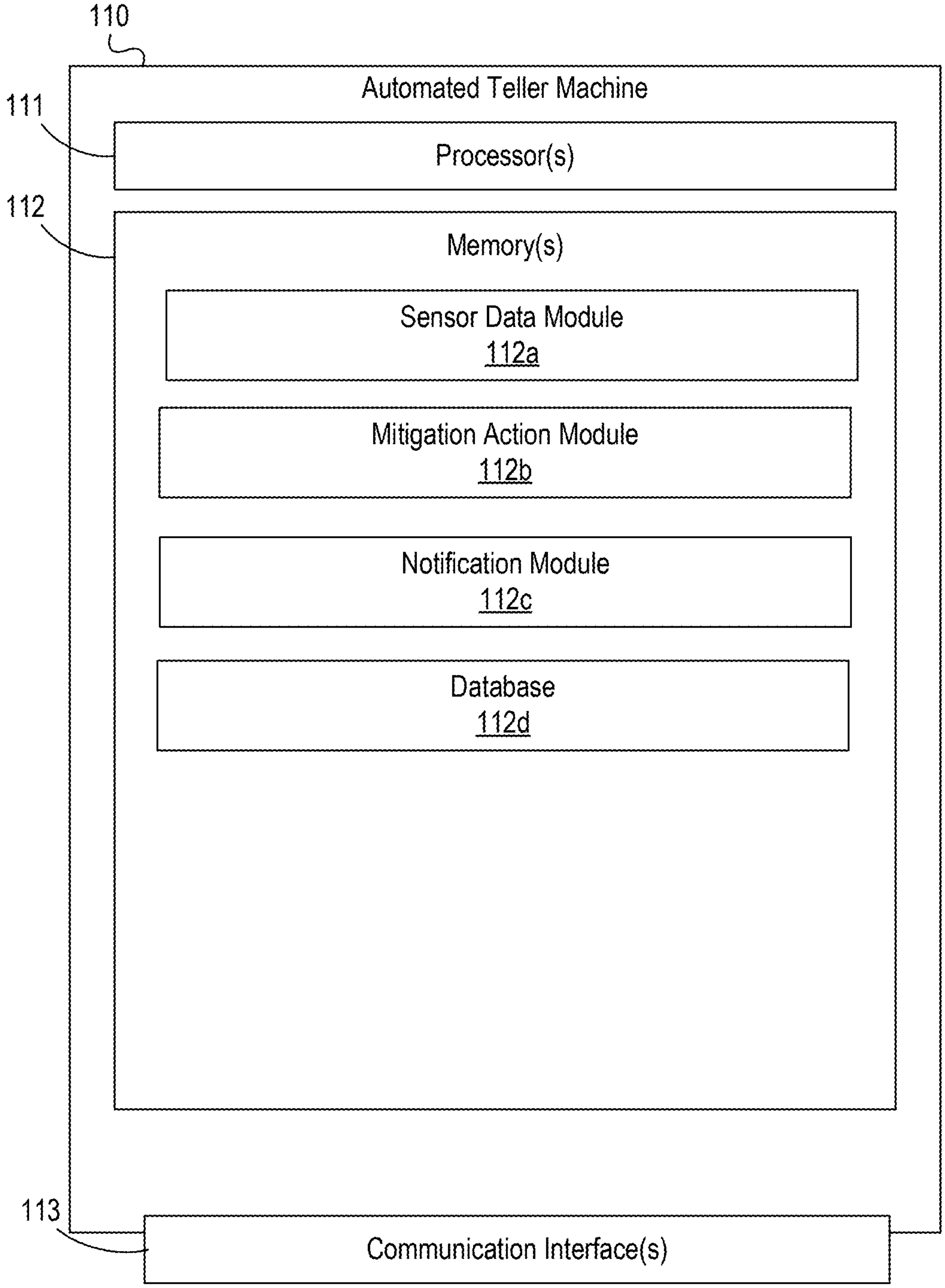

FIGS. 1A-1B depict an illustrative computing environment and devices for detecting unauthorized devices at an automated teller machine (ATM) in accordance with one or more aspects described herein. Referring to FIG. 1A, computing environment 100 may include one or more computing devices and/or other computing systems. For example, computing environment 100 may include automated teller machine 110, enterprise computing system 120, and/or vendor computing device 130.

Although one ATM 110, one enterprise computing system 120, and one vendor computing device 130 are shown, any number of systems or devices may be used without departing from the invention.

Automated teller machine 110 may be or include one or more computer components (e.g., servers, server blade, processor, memory, and the like) and may be configured to perform intelligent, dynamic, real-time evaluation of components of the ATM to detect a presence of an unauthorized device physically located within the ATM (e.g., inserted into a card acceptor slot, or the like). For instance, ATM 110 may include a card acceptor having one or more sensors arranged therein. The sensors may be configured to detect a physical presence of one or more magnets within the ATM, card acceptor, or the like. For instance, skimming devices often have magnets, such as rare earth magnets, arranged thereon. When the skimmer is inserted into the card acceptor, the sensors arranged therein may detect a presence of the magnets on the skimmer. Because the sensors detect a physical presence of a magnet, the sensors may detect a skimmer that is in use or a skimmer that is not in use (e.g., does not have a battery connected, is not passing voltage through it at any given time, or the like).

In some examples, the one or more sensors may include Hall effect sensors. Accordingly, in some examples, the sensors may communicate, to the automated teller machine 110, whether a magnet is present. In a conventional, untampered ATM, there should be no magnet within the card acceptor or ATM. Accordingly, detection of a magnet by the one or more Hall effect sensors may indicate a presence of a magnet and, thus, presence of an unauthorized device or object within the ATM or card acceptor of the ATM.

In response to receiving an indication of presence of a magnet, in some examples, ATM 110 may generate a mitigation action and a notification indicating that an unauthorized object has been detected. In some examples, the mitigation action may include disabling the ATM 110, disabling the card acceptor of the ATM 110, displaying a notification that the card acceptor is unavailable and requesting users use another form of authentication (e.g., tap, mobile application, or the like), and the like. In some examples, the ATM 110 may execute the mitigation action. In some arrangements, the ATM may wait a predetermined time before executing the mitigation action. For instance, while the ATM 110 may be immediately notified of the detected presence of the unauthorized object inserted into the card acceptor, the threat actor may still be present at the ATM 110. To avoid providing notice to the threat actor that the unauthorized device has been detected, the ATM may wait until a predetermined time period has elapsed (e.g., two minutes, five minutes, 10 minutes, or the like) before executing the mitigation action.

ATM 110 may generate a notification indicating that the unauthorized device has been detected. The ATM 110 may transmit or send the notification to the enterprise computing system 120 which may cause the enterprise computing system 120 to display the notification. In some examples, the enterprise computing system 120 may generate a notification and transmit the notification to a vendor (e.g., vendor computing device 130) who may service the ATM. The notification may indicate that an unauthorized device is present and may request service for the ATM.

Enterprise computing system 120 may be or include one or more computer components (e.g., servers, server blade, processor, memory, and the like) and may be configured to host or store one or more applications or data associated with controlling ATM functions, processing ATM transactions, and the like. For instance, enterprise computing system 120 may adjust account ledgers based on ATM transactions, control and/or dispatch maintenance or service for one or more ATM, generate, transmit and/or display notifications regarding issues at an ATM, and the like.

Vendor computing device 130 may be or include one or more computing devices (e.g., laptop computers, desktop computers, mobile devices, tablet devices, or the like) and may be configured to receive notifications regarding maintenance or service at one or more ATMs, dispatch a technician to remove unauthorized devices identified within an ATM, display notifications, and the like.

As mentioned above, computing environment 100 also may include one or more networks, which may interconnect one or more of ATM 110, enterprise computing system 120, and/or vendor computing device 130. For example, computing environment 100 may include network 190. Network 190 may, in some examples, be a private network and include one or more sub-networks (e.g., Local Area Networks (LANs), Wide Area Networks (WANs), or the like). In some examples, network 190 may be a public network or may include a public network and private network in communication with each other. Network 190 may interconnect one or more computing devices associated with the organization and/or external to the organization. For example, ATM 110, enterprise computing system 120, and/or vendor computing device 130 may be connected via network 190.

Referring to FIG. 1B, ATM 110 may include one or more processors 111, memory 112, and communication interface 113. A data bus may interconnect processor(s) 111, memory 112, and communication interface 113. Communication interface 113 may be a network interface configured to support communication between ATM 110 and one or more networks (e.g., network 190, or the like). Memory 112 may include one or more program modules having instructions that when executed by processor(s) 111 cause ATM 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of ATM 110 and/or by different computing devices that may form and/or otherwise make up ATM 110.

For example, memory 112 may have, store and/or include sensor data module **112*a*. Sensor data module 112*a* may store instructions and/or data that may cause or enable the ATM 110 to receive, from one or more Hall effect sensors arranged in the ATM 110 or in the card acceptor of the ATM 110, data indicating a presence or absence of a physical magnet within the ATM 110 or card acceptor of the ATM 110. The presence of one or more physical magnets within the ATM 110 or within the card acceptor of the ATM 110 may indicate a presence of an unauthorized device (e.g., a skimmer) within the ATM 110 or the card acceptor of the ATM 110. In some examples, a plurality of Hall effect sensors may be arranged in the ATM 110 or in the card acceptor of the ATM 110 and data may be received from one of more of the plurality of sensors. The sensor data may then be used to determine a physical profile of an unauthorized device within the ATM 110 or card acceptor of the ATM 110**. Further, receiving data from a plurality of sensors may provide redundancy and avoid potential false negatives (e.g., if a single sensor is used and does not function properly, an unauthorized device may go undetected. The additional sensors will ensure detection of unauthorized devices even if one sensor fails).

ATM 110 may further have, store and/or include mitigation action module **112*b*. Mitigation action module 112*b* may store instructions and/or data that may cause or enable the ATM 110 to generate and/or execute one or more mitigation actions in response to sensor data indicating a presence of a magnet and/or an unauthorized device within the ATM 110. For instance, in response to sensor data indicating a presence of a magnet, mitigation action module 112*b* may generate an instruction or command to shut down the ATM 110, display a notification on a display of the ATM 110, disable the card acceptor of the ATM 110, limit authentication options to contactless authentication (e.g., "tap" technology via near-field communication or the like), mobile application, or the like, and the like. In some examples, mitigation action module 112***b* may execute the generated mitigation action. In some arrangements, the ATM 110 may determine whether a delay command is available. If so, the delay command may cause the ATM 110 to delay execution of the generated mitigation action until a predetermined time (e.g., 5 minutes, 10 minutes or the like) has elapsed. This may ensure that the threat actor associated with the unauthorized device is no longer present when the mitigation action is executed and will not be aware of the mitigation action.

ATM 110 may further have, store and/or include notification module 112*c*. Notification module 112*c* may store instructions and/or data that may cause or enable the ATM 110 to generate and transmit one or more notifications indicating, for instance, that an unauthorized device has been detected.

ATM 110 may further have, store and/or include database 112*d*. Database 112*d* may store data related ATM transactions, detected devices, sensor data and/or any other data to perform the functions of the ATM 110.

Figure 2A:
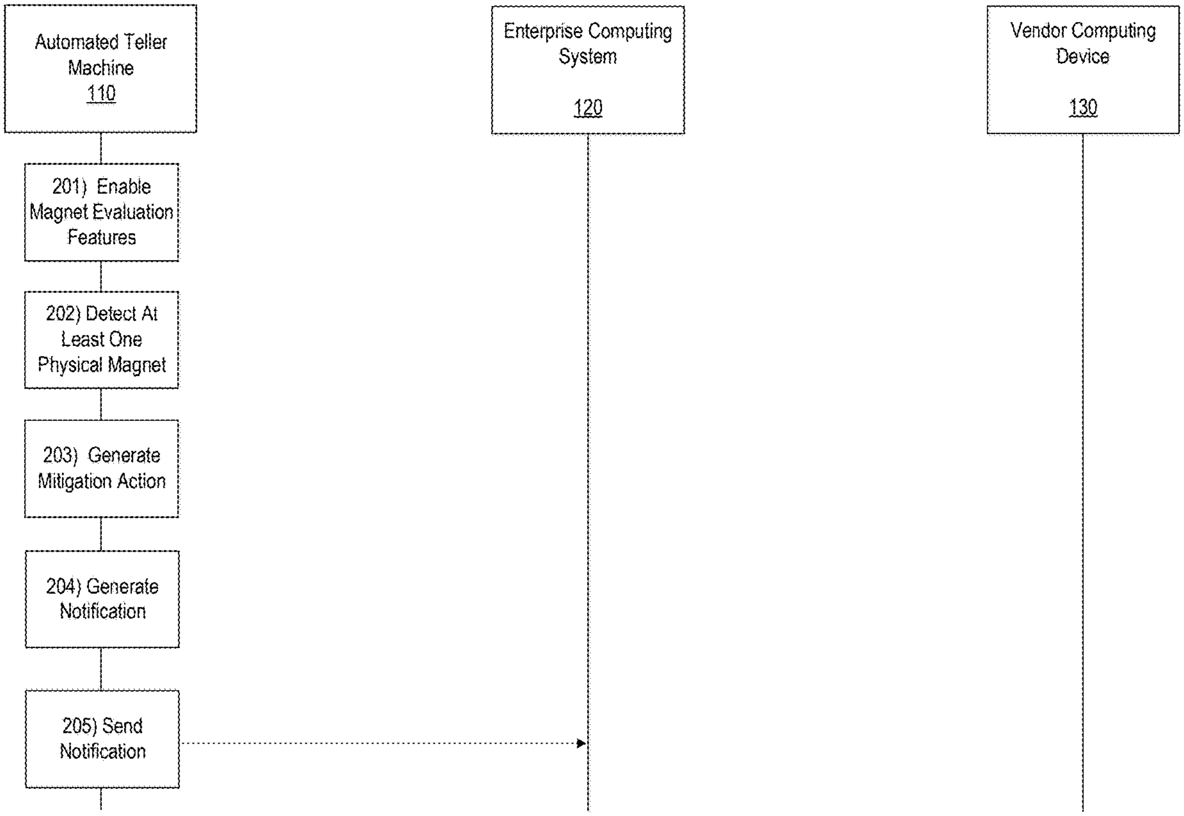
FIGS. 2A-2C depict an illustrative event sequence for detecting unauthorized devices at an ATM in accordance with one or more aspects described herein.
Figure 2B:
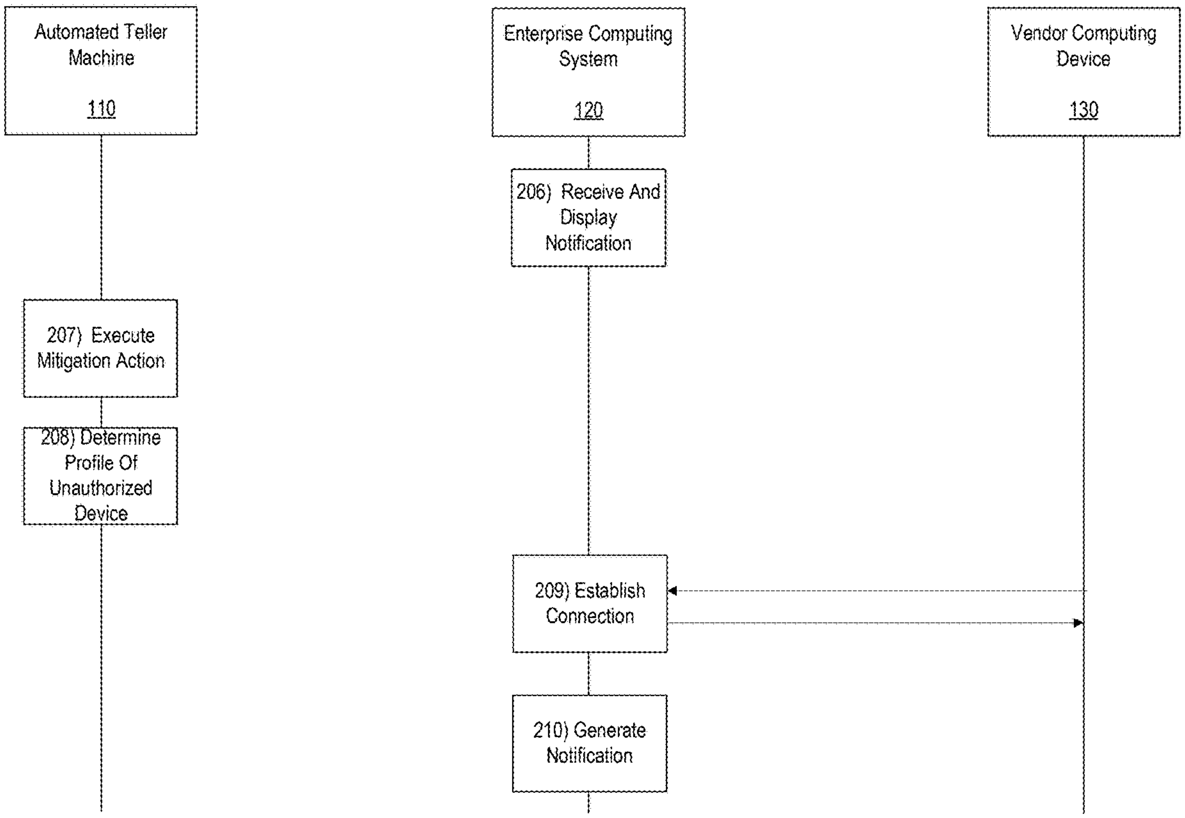
Figure 2C:
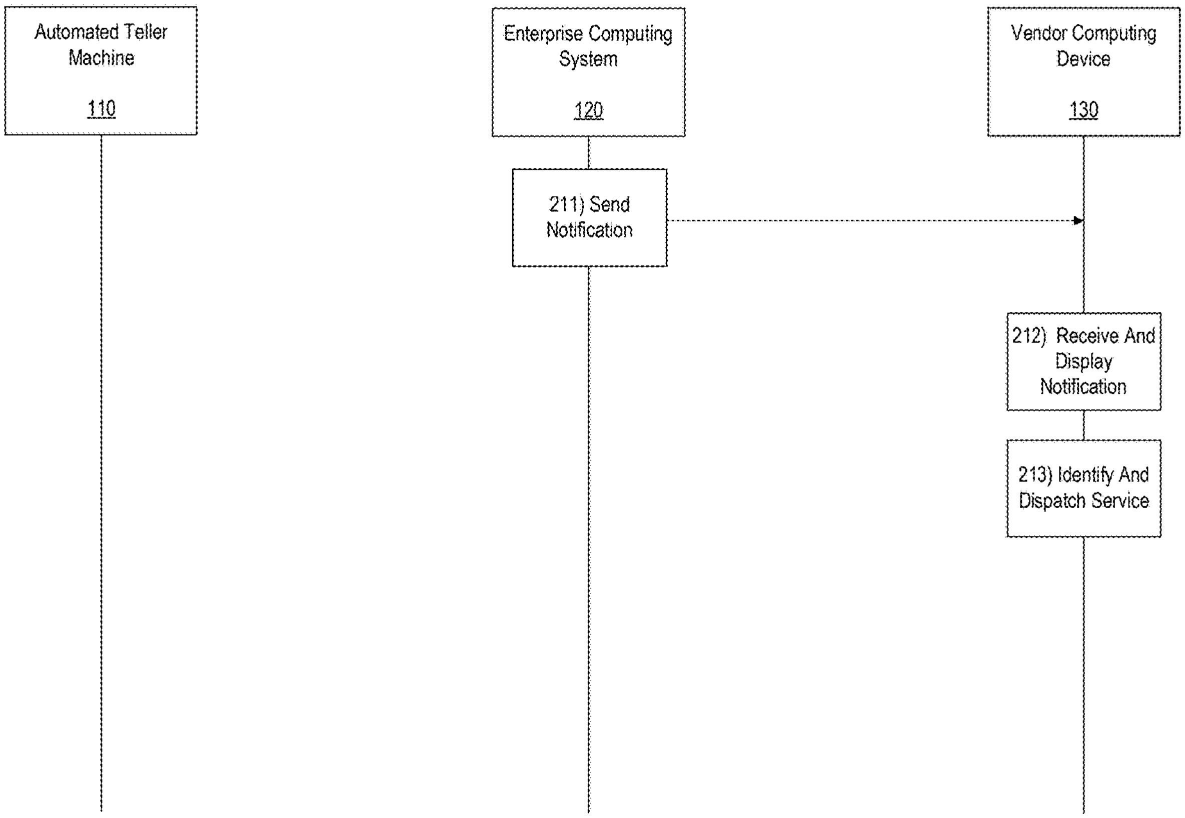

FIGS. 2A-2C depict one example illustrative event sequence for detecting unauthorized devices at an ATM in accordance with one or more aspects described herein. The events shown in the illustrative event sequence are merely one example sequence and additional events may be added, or events may be omitted, without departing from the invention. Further, one or more processes discussed with respect to FIGS. 2A-2C may be performed in real-time or near real-time.

With reference to FIG. 2A, at step 201, ATM 110 may enable magnet detection features. For instance, ATM 110 may be installed with a card acceptor having one or more sensors for detecting a physical magnet within the card acceptor. In some examples, enabling magnet detection may include modifying software for operating the ATM to enable receipt of sensor data, analysis of sensor data, generation of mitigation actions, and the like.

At step 202, ATM 110 may detect at least one magnet. For instance, sensor data may be received from the one or more sensors in the ATM 110 or the card acceptor of the ATM indicating that a magnet has been detected. In some examples, data detecting a magnet may be received from a plurality of sensors within the ATM 110. In some examples, the sensor(s) may transmit a signal indicating a magnet has been detected.

In response to receiving the signal, ATM 110 may generate a mitigation action at step 203. For instance, ATM 110 may generate an instruction or command that may cause the ATM 110 to disable all functionality, display one or more notifications on a display of the ATM 110 (e.g., "out of service," "card reader not available," or the like), disable a card acceptor, modify accepted forms of authentication, or the like.

At step 204, ATM 110 may generate a notification indicating that an unauthorized device has been detected at the ATM 110 (e.g., based on the sensor data indicating a presence of a magnet).

At step 205, ATM 110 may transmit or send the notification to, for instance, enterprise computing system 120. In some examples, transmitting or sending the notification may cause the notification to be displayed by a display of the enterprise computing system 120.

Figure 6:
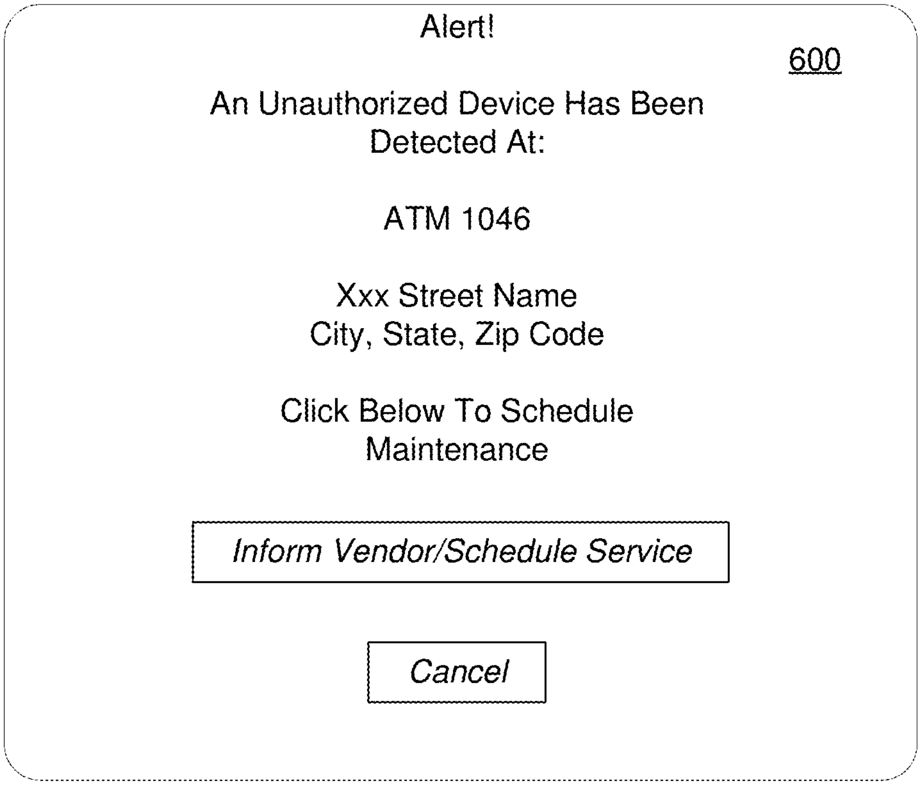
FIGS. 6 and 7 depict illustrative user interfaces that may be generated in accordance with one or more aspects described herein.

With reference to FIG. 2B, at step 206, enterprise computing system 120 may receive and display the notification on the display of the enterprise computing system 120. FIG. 6 illustrates one example notification that may be generated and displayed. For instance, notification 600 may include an indication that an unauthorized device has been detected, a location of the ATM impacted, and the like. In some examples, the notification 600 may include a selectable link to inform a vendor of the unauthorized device and request maintenance or service.

At step 207, ATM 110 may execute the mitigation action. In some examples, ATM 110 may execute the mitigation action immediately upon detecting the unauthorized device (e.g., based on the sensor data) and generating the mitigation action. In other examples, ATM 110 may determine whether a time delay command is in place. For instance, ATM 110 may have a pre-stored time delay command causing any mitigation actions to be held for a predetermined time before execution. Accordingly, if an unauthorized actor inserts the unauthorized device into the ATM 110, the ATM 110 may immediately receive a signal indicating a presence of a magnet and unauthorized device but may wait a predetermined amount of time (e.g., 2 minutes, 5 minutes, 10 minutes, or the like) to execute any generated mitigation actions to avoid informing the unauthorized actor that the unauthorized device has been detected (e.g., to enable the enterprise organization to retrieve the unauthorized device).

In some examples, executing the mitigation action may include disabling the ATM 110, disabling the card acceptor of the ATM 110, modifying functionality of the ATM 110, displaying a notification, and the like.

At step 208, ATM 110 may determine a profile of the unauthorized device. For instance, if a plurality of Hall effect sensors is arranged in the card acceptor, a signal from each sensor (e.g., indicating a presence of a magnet) may be used to determine a physical profile of the unauthorized device in the ATM 110.

At step 209, enterprise computing system 120 may establish a wireless data connection with vendor computing device 130. Although a connection to one vendor computing device is shown, in some examples, enterprise computing system 120 may connect to more than one vendor computing device 130. In some examples, enterprise computing system 120 may initiate a communication session with vendor computing device 130 in response to establishing the wireless data connection.

At step 210, enterprise computing system 120 may generate a notification indicating a presence of an unauthorized device in ATM 110 and requesting or scheduling maintenance, service or the like for ATM 110.

Figure 7:
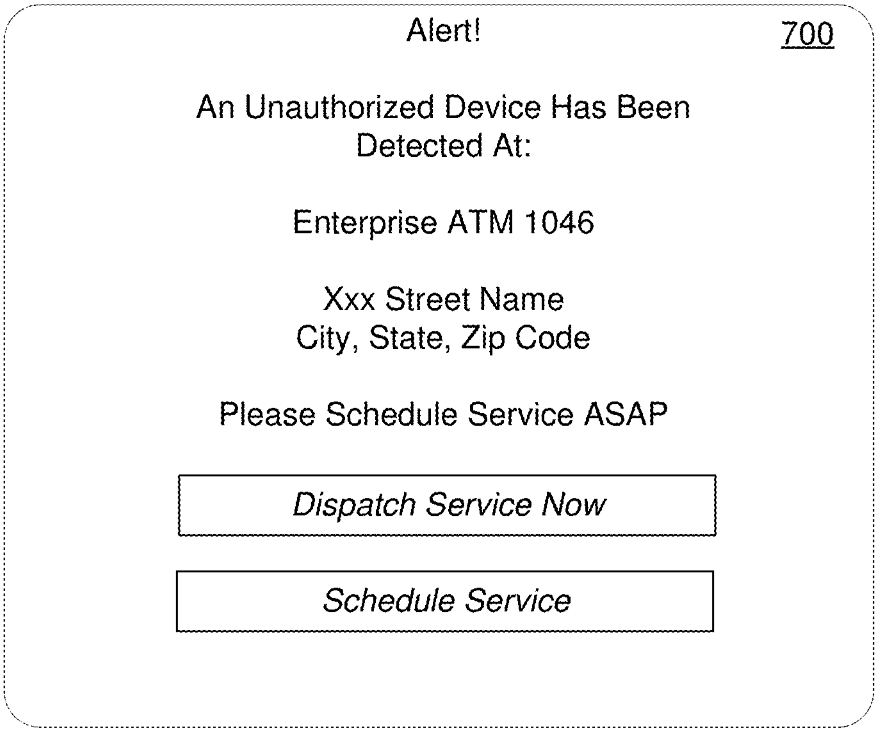

With reference to FIG. 2C, at step 211, enterprise computing system 120 may transmit or send the notification to the vendor computing device 130. In some examples, transmitting or sending the notification may cause the notification to be displayed by a display of the vendor computing device 130. FIG. 7 illustrates one example notification that may be displayed by vendor computing device 130. The notification 700 may include an indication that an unauthorized device was detected, a location of the ATM, an enterprise associated with the ATM, an option to dispatch service now and/or an option to schedule service.

At step 212, vendor computing device 130 may receive and display the notification on a display of vendor computing device 130.

At step 213, based on the information received in the notification, vendor computing device 130 may identify, schedule and/or dispatch service to the ATM 110 at which the unauthorized device was detected.

Figure 3:
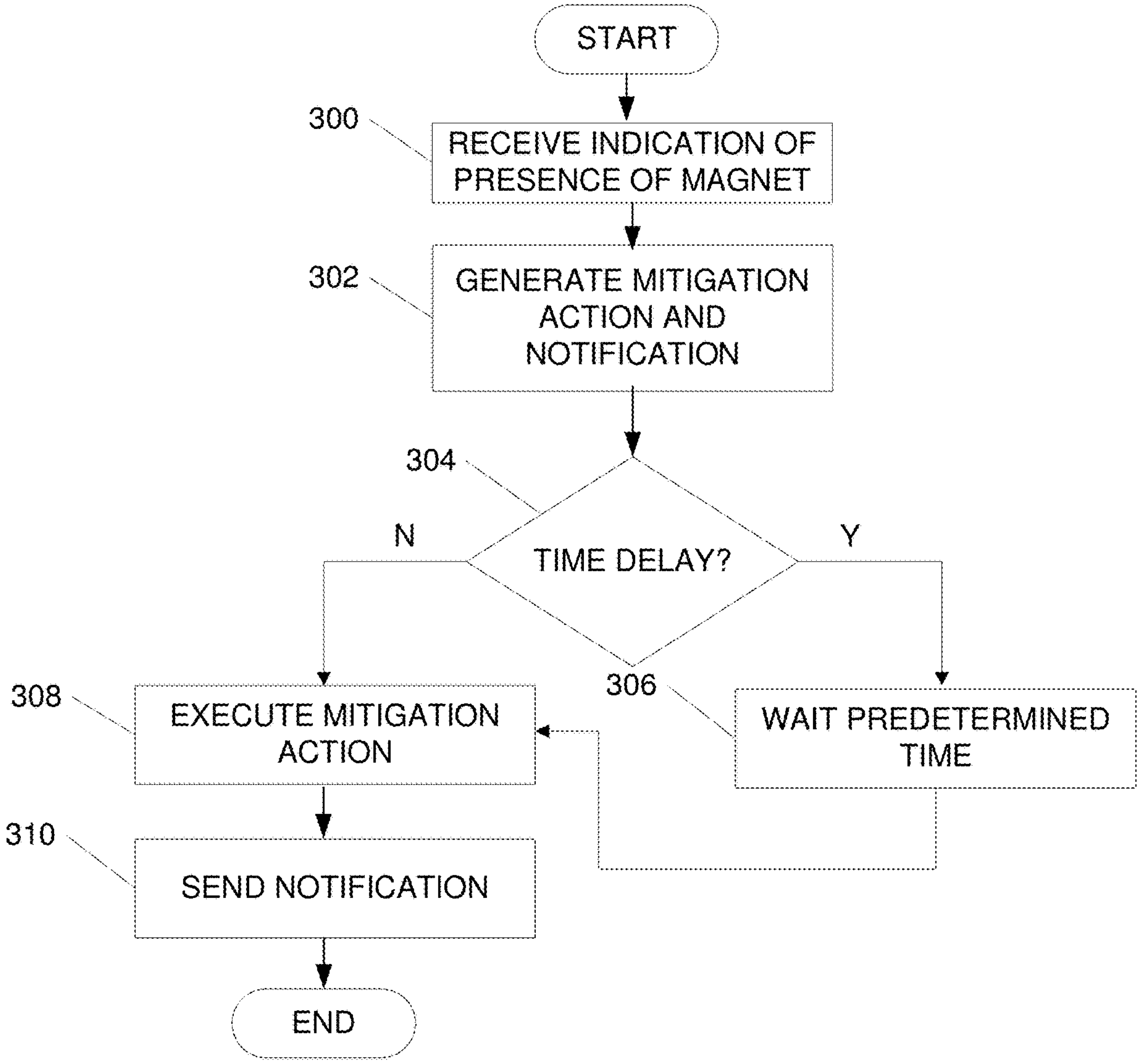
FIG. 3 illustrates an illustrative method for detecting unauthorized devices at an ATM according to one or more aspects described herein.

FIG. 3 is a flow chart illustrating one example method of detecting unauthorized devices at an ATM in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, an automated teller machine 110 having a display, a card acceptor including a card reader and at least one Hall effect sensor within the card acceptor, memory and processor, may receive an indication of a presence of a physical magnet within the card acceptor. In some examples, the at least one Hall effect sensor may include a plurality of hall Hall effect sensors. In some examples, the at least one Hall effect sensor is configured to detect the presence of the physical magnet with the magnet (and/or associated unauthorized device) is in an in-use state (e.g., has a power supply that is powered up, or the like) or in a disabled state (e.g., has no power supply, power supply is not functioning, or the like).

At step 302, based on the indication of the presence of the physical magnet within the card acceptor, ATM 110 may generate a mitigation action and a notification indicating a presence of an unauthorized device within the card acceptor based on the indication of the presence of the physical magnet within the card acceptor.

At step 304, ATM 110 may determine whether a time delay command is present. If not, at step 308, ATM 110 may execute the mitigation action which may cause a modification to the functionality of the ATM. For instance, the mitigation action may disable the ATM 110, may disable the card acceptor of the ATM 110 and may cause an indication that the card acceptor is disabled to be displayed on a display of the ATM, or the like. In some examples, the indication that the card acceptor is disabled may include instructions to initiate transactions using other processes such as contactless initiation or authentication (e.g., via tap technology of a user card or payment device), via a mobile application executing on a user computing device, or the like.

At step 310, the ATM 110 may transmit or send the notification to an enterprise computing system 120 which may cause the notification to be displayed by a display of the enterprise computing system 120.

If, at step 304, a time delay command is detected, at step 306, ATM 110 may wait a predetermined time period (e.g., 2 minutes, 5 minutes, 10 minutes, 15 minutes, or the like) and then may proceed to step 308 to execute the mitigation action after the predetermined time period has elapsed.

Figure 4:
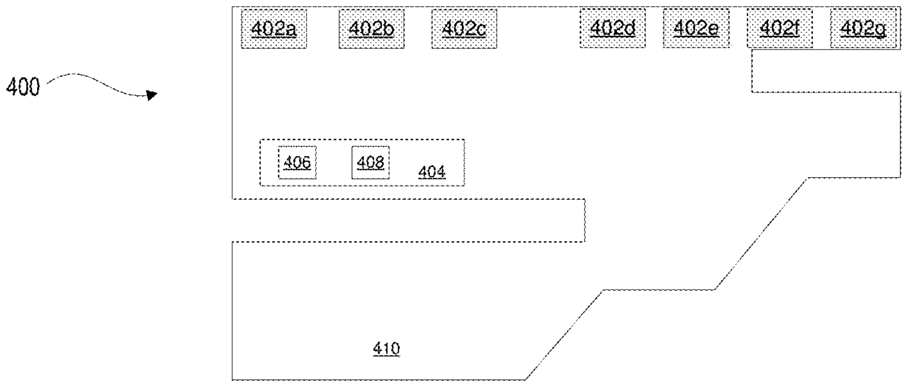
FIG. 4 illustrates one example unauthorized device that may be detected in accordance with one or more aspects described herein.

FIG. 4 illustrates one example unauthorized device 400 that may be detected using one or more aspects described herein. In some examples, the unauthorized device 400 may be a skimmer device configured to be inserted into a card acceptor at an ATM, such as ATM 110. The arrangement of the unauthorized device 400 shown in merely one example arrangement and various other arrangements, configurations, and the like, may be used without departing from the invention.

The unauthorized device 400 may include a substrate 410 that may be inserted into the card acceptor of the ATM 110. The substrate may be formed of plastic, carbon fiber, metal, or the like, and may have various shapes to fit within different card acceptors. The shape shown is merely one example and various other shapes may be used without departing from the invention. The substrate 410 may include one or more physical magnets 402*a*-402*g*. Although seven magnets are shown in this example device 400, more or fewer magnets may be used without departing from the invention.

The substrate 410 of unauthorized device 400 may further include a printed circuit board 404, processor 406 and power supply 408, which are shown schematically. In some examples, components such as a power supply 408, processor 406, printed circuit board 404, or the like, may be absent from the unauthorized device 400 upon an initial insertion of the unauthorized device 400 into the card acceptor. For instance, unauthorized users may, in some instances, test the unauthorized device 400 in the card acceptor (e.g., prior to installing the unauthorized device 400 in the card acceptor). In some examples, testing the unauthorized device 400 may include inserting the unauthorized device in a disabled or unusable state (e.g., without a power supply, or the like) into the card acceptor to ensure size, fit, and the like. The unauthorized user may, in some examples, remove the unauthorized device 400 to make modifications prior to installing the unauthorized device 400 in the in-use state (e.g., fully functioning, power supply installed and powered on, or the like).

Regardless of whether the unauthorized device is in a disabled state or an in-use state, the arrangements described herein including the use of one or more Hall effect sensors may detect a presence of one or more of the physical magnets 402*a*-402*g*. In some examples, signals from the Hall effect sensors may detect more than one magnet 402*a*-402*g* and the signals may be used to identify or determine a shape or profile of the unauthorized device (e.g., based on position of a Hall effect sensor indicating a presence of a magnet).

Figure 5:
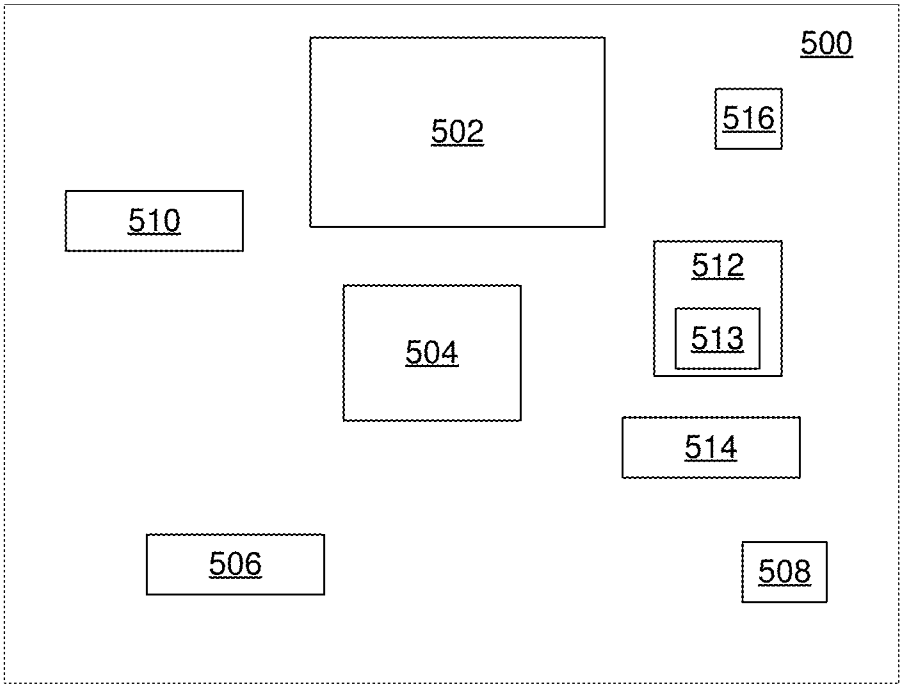
FIG. 5 is a schematic diagram of an ATM in accordance with one or more aspects described herein.

FIG. 5 is a schematic diagram of a front face of an ATM that may be used in accordance with one or more aspects described herein. The arrangement shown in FIG. 5 is merely one ATM arrangement and various other arrangements of components may be used without departing from the invention.

The ATM 500 shown includes a plurality of components, such as a display screen 502, keypad 504, cash dispensing slot 506, headphone jack 508, receipt dispensing slot 510, card acceptor 512, deposit receiving slot 514, microphone 516, and the like. As discussed herein, one or more Hall effect sensors 513 may be arranged within the card acceptor to detect the presence of a physical magnet. In some examples, display screen 502 may display a notification to users that the ATM has been disabled, that the card acceptor is disabled, or the like, in response to execution of a mitigation action.

As discussed herein, aspects described include the use of Hall effect sensors arranged in a card acceptor of an ATM to detect a presence of a physical magnet within the card acceptor. While the arrangements described herein are provided in the context of an ATM, the arrangements described may be used to detect unauthorized devices in other terminals having a card acceptor or card reader, such as point-of-sale terminals, and the like.

Further, as discussed herein, the arrangements described enable detection of unauthorized devices in an ATM or card acceptor based on detection of a physical presence of a magnet. Accordingly, even if the unauthorized device is disabled, has no power to it, or the like, the arrangements described herein may still detect the presence of the magnet, even if no current is being passed through one or more wires on the unauthorized device.

The arrangements described herein may further provide few if any false positives. The vast majority of skimmers have rare earth magnets used on them. Accordingly, detection of the magnet in the card acceptor, where no magnet is expected, is indicative of a presence of an unauthorized device. The Hall effect sensor may provide a binary output of yes, a magnet is present or no a magnet is not present. For instance, the Hall effect sensor may only provide a signal to the ATM indicating when a magnet is detected.

In some examples, mitigation actions may include capturing additional data associated with the ATM. For instance, the ATM may retrieve image data (e.g., from one or more cameras in the ATM, in an ATM vestibule, or the like), audio data from areas near the ATM and the like, and may transmit that data to, for instance, enterprise computing system 120 for further analysis (e.g., to identify unauthorized actor, provide to law enforcement, or the like).

The arrangements described herein generally include the one or more Hall effect sensors arranged within the card acceptor. In some examples, the Hall effect sensor may be arranged on an outer surface of the card acceptor, near a card acceptor on another portion of the ATM, or the like, without departing from the invention.

Further, the arrangements described herein may be used in newly constructed ATMs and/or may be retrofitted to existing ATMs (e.g., a card acceptor module may be removed from an existing ATM and replaced with a card acceptor including the one or more Hall effect sensors). In some examples, retrofitting the ATM may include updating software associated with the ATM to discover the sensors, enable the ATM to receive sensor data, and the like.

Figure 8:
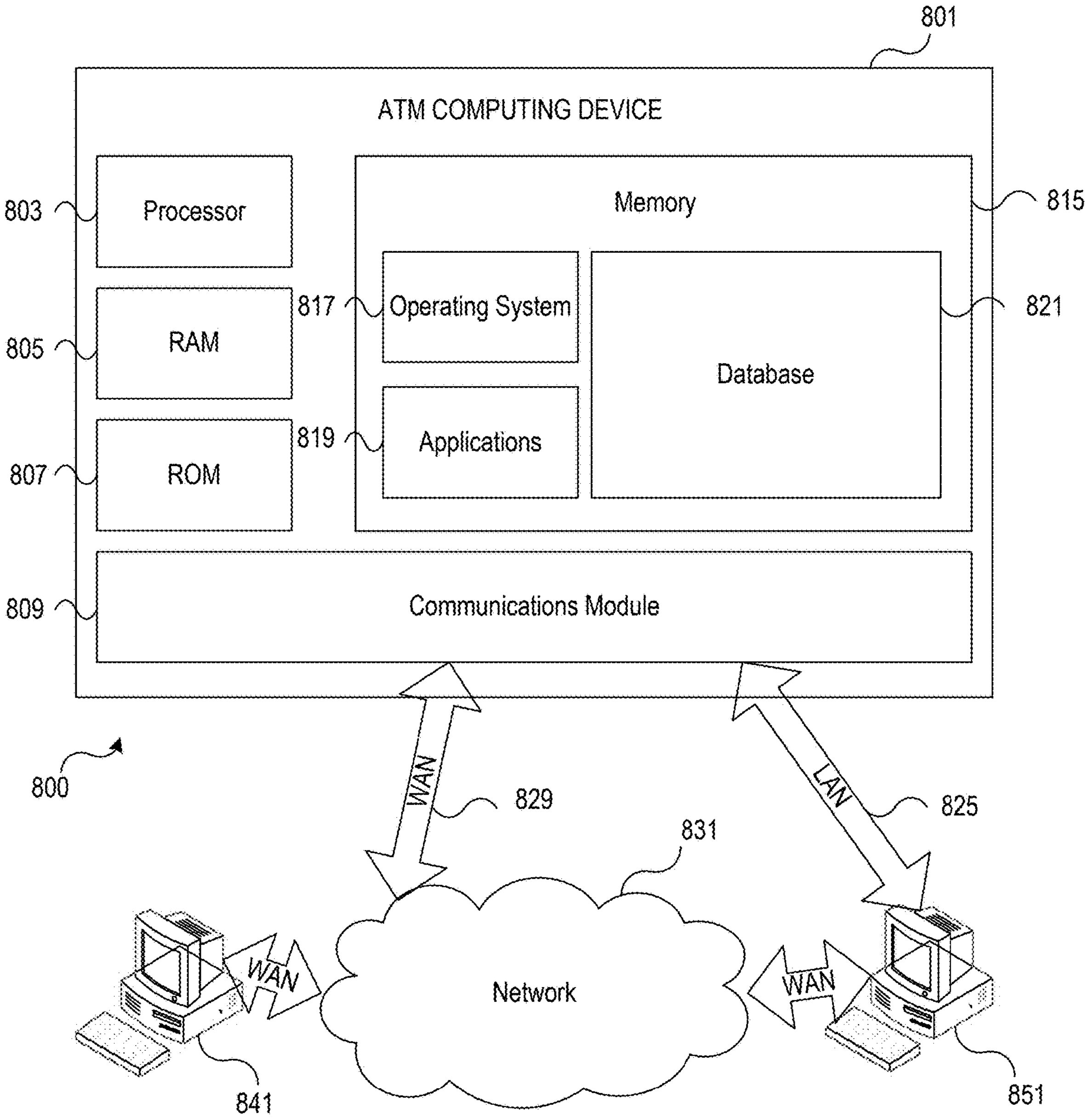
FIG. 8 illustrates one example environment in which various aspects of the disclosure may be implemented in accordance with one or more aspects described herein.

FIG. 8 depicts an illustrative operating environment in which various aspects of the present disclosure may be implemented in accordance with one or more example embodiments. Referring to FIG. 8, computing system environment 800 may be used according to one or more illustrative embodiments. Computing system environment 800 is only one example of a suitable computing environment and is not intended to suggest any limitation as to the scope of use or functionality contained in the disclosure. Computing system environment 800 should not be interpreted as having any dependency or requirement relating to any one or combination of components shown in illustrative computing system environment 800.

Computing system environment 800 may include automated teller machine (ATM) computing device 801 having processor 803 for controlling overall operation of ATM computing device 801 and its associated components, including Random Access Memory (RAM) 805, Read-Only Memory (ROM) 807, communications module 809, and memory 815. ATM computing device 801 may include a variety of computer readable media. Computer readable media may be any available media that may be accessed by ATM computing device 801, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by ATM computing device 801.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor (e.g., hardware processor) on ATM computing device 801. Such a processor may execute computer-executable instructions stored on a computer-readable medium.

Software may be stored within memory 815 and/or storage to provide instructions to processor 803 for enabling ATM computing device 801 to perform various functions as discussed herein. For example, memory 815 may store software used by ATM computing device 801, such as operating system 817, application programs 819, and associated database 821. Also, some or all of the computer executable instructions for ATM computing device 801 may be embodied in hardware or firmware. Although not shown, RAM 805 may include one or more applications representing the application data stored in RAM 805 while ATM computing device 801 is on and corresponding software applications (e.g., software tasks) are running on ATM computing device 801.

Communications module 809 may include a microphone, keypad, touch screen, and/or stylus through which a user of ATM computing device 801 may provide input, and may also include one or more of a speaker for providing audio output and a video display device for providing textual, audiovisual and/or graphical output. Computing system environment 800 may also include optical scanners (not shown).

ATM computing device 801 may operate in a networked environment supporting connections to one or more remote computing devices, such as computing devices 841 and 851. Computing devices 841 and 851 may be personal computing devices or servers that include any or all of the elements described above relative to ATM computing device 801. Computing devices 841 and 851 may, in some examples, correspond to enterprise computing system 120 and vendor computing device 130.

The network connections depicted in FIG. 8 may include Local Area Network (LAN) 825 and Wide Area Network (WAN) 829, as well as other networks. When used in a LAN networking environment, ATM computing device 801 may be connected to LAN 825 through a network interface or adapter in communications module 809. When used in a WAN networking environment, ATM computing device 801 may include a modem in communications module 809 or other means for establishing communications over WAN 829, such as network 831 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. An automated teller machine, comprising:

a display;

a card acceptor including a card reader and at least one hall effect sensor within the card acceptor;

at least one processor;

a communication interface communicatively coupled to the at least one processor; and a memory storing computer-readable instructions that, when executed by the at least one processor, cause the automated teller machine to:

receive, from the at least one Hall effect sensor, an indication of a presence of a physical magnet within the card acceptor, wherein the at least one Hall effect sensor is configured to detect the presence of the physical magnet within the card acceptor when an unauthorized device is in an in-use state and when the unauthorized device is in a disabled state;

generate, based on the indication of the presence of the physical magnet within the card acceptor, a mitigation action and a notification indicating a presence of the unauthorized device within the card acceptor based on the indication of the presence of the physical magnet within the card acceptor;

execute the mitigation action, wherein executing the mitigation action causes a modification in functionality of the automated teller machine; and send, to an enterprise computing system, the notification, wherein sending the notification causes the notification to be displayed by a display of the enterprise computing system.

2. The automated teller machine of claim 1, wherein the at least one Hall effect sensor includes a plurality of Hall effect sensors.

3. The automated teller machine of claim 2, wherein receiving, from the at least one Hall effect sensor, the indication of the presence of the physical magnet within the card acceptor includes receiving, from the plurality of Hall effect sensors, a plurality of indications of at least one magnet within the card acceptor and determining, based on the plurality of indications, a physical profile of the unauthorized device within the card acceptor.

4. The automated teller machine of claim 1, wherein the mitigation action includes disabling the automated teller machine.

5. The automated teller machine of claim 1, wherein the mitigation action includes disabling the card acceptor and causing, to display on the display of the automated teller machine, an indication that the card acceptor is disabled.

6. The automated teller machine of claim 5, wherein the indication that the card acceptor is disabled further includes instructions to initiate a transaction at the automated teller machine using one of: contactless technology or a mobile application executing on a user computing device.

7. The automated teller machine of claim 1, further including instructions that, when executed, cause the automated teller machine to:

after generating the mitigation action and before executing the mitigation action:

determine whether a time delay command is present;

responsive to determining that a time delay command is not present, execute the mitigation action; and responsive to determining that a time delay command is present, wait a predetermined time before executing the mitigation action.

8. A method, comprising;

receiving, by an automated teller machine having a display, a card acceptor including a card reader and at least one Hall effect sensor within the card acceptor, at least one processor, and memory, and from the at least one Hall effect sensor, an indication of a presence of a physical magnet within the card acceptor, wherein the at least one Hall effect sensor is configured to detect the presence of the physical magnet within the card acceptor when an unauthorized device is in an in-use state and when the unauthorized device is in a disabled state;

generating, by the at least one processor and based on the indication of the presence of the physical magnet within the card acceptor, a mitigation action and a notification indicating a presence of an unauthorized device within the card acceptor based on the indication of the presence of the physical magnet within the card acceptor;

executing, by the at least one processor, the mitigation action, wherein executing the mitigation action causes a modification in functionality of the automated teller machine; and sending, by the at least one processor and to an enterprise computing system, the notification, wherein sending the notification causes the notification to be displayed by a display of the enterprise computing system.

9. The method of claim 8, wherein the at least one Hall effect sensor includes a plurality of Hall effect sensors.

10. The method of claim 9, wherein receiving, from the at least one Hall effect sensor, the indication of the presence of the physical magnet within the card acceptor includes receiving, from the plurality of Hall effect sensors, a plurality of indications of at least one magnet within the card acceptor and determining, based on the plurality of indications, a physical profile of the unauthorized device within the card acceptor.

11. The method of claim 8, wherein the mitigation action includes disabling the automated teller machine.

12. The method of claim 8, wherein the mitigation action includes disabling the card acceptor and causing, to display on the display of the automated teller machine, an indication that the card acceptor is disabled.

13. The method of claim 12, wherein the indication that the card acceptor is disabled further includes instructions to initiate a transaction at the automated teller machine using one of: contactless technology or a mobile application executing on a user computing device, and that other forms of authentication should be used.

14. The method of claim 8, further including:

after generating the mitigation action and before executing the mitigation action:

determining, by the at least one processor, whether a time delay command is present;

responsive to determining that a time delay command is not present, executing, by the at least one processor, the mitigation action; and responsive to determining that a time delay command is present, waiting, by the at least one processor, a predetermined time before executing the mitigation action.

15. One or more non-transitory computer-readable media storing instructions that, when executed by an automated teller machine having a display, a card acceptor including a card reader and at least one Hall effect sensor within the card acceptor, at least one processor, memory, and a communication interface, cause the automated teller machine to:

receive, from the at least one Hall effect sensor, an indication of a presence of a physical magnet within the card acceptor, wherein the at least one Hall effect sensor is configured to detect the presence of the physical magnet within the card acceptor when an unauthorized device is in an in-use state and when the unauthorized device is in a disabled state;

generate, based on the indication of the presence of the physical magnet within the card acceptor, a mitigation action and a notification indicating a presence of an unauthorized device within the card acceptor based on the indication of the presence of the physical magnet within the card acceptor;

execute the mitigation action, wherein executing the mitigation action causes a modification in functionality of the automated teller machine; and send, to an enterprise computing system, the notification, wherein sending the notification causes the notification to be displayed by a display of the enterprise computing system.

16. The one or more non-transitory computer-readable media of claim 15, wherein the mitigation action includes disabling the automated teller machine.

17. The one or more non-transitory computer-readable media of claim 15, further including instructions that, when executed, cause the automated teller machine to:

after generating the mitigation action and before executing the mitigation action:

determine whether a time delay command is present;

responsive to determining that a time delay command is not present, execute the mitigation action; and responsive to determining that a time delay command is present, wait a predetermined time before executing the mitigation action.

* * * * *